United States Patent [19]

Taguchi et al.

[11] E Patent Number: Re. 32,976

[45] Reissued Date of Patent: Jul. 4, 1989

[54] SODIUM CARBOXYMETHYLCELLULOSE

[75] Inventors: Atsushi Taguchi; Takeo Ohmiya, both of Himeji, Japan

[73] Assignee: Daicel Chemical Industries, Ltd., Osaka, Japan

[21] Appl. No.: 63,210

[22] Filed: Jun. 17, 1987

Related U.S. Patent Documents

Reissue of:

[64] Patent No.: 4,525,585
Issued: Jun. 25, 1985
Appl. No.: 537,903
Filed: Sep. 30, 1983

[30] Foreign Application Priority Data

Oct. 4, 1982 [JP] Japan ..... 57-174225

[51] Int. Cl.[4] ..... C08B 11/00
[52] U.S. Cl. ..... 536/98; 106/170
[58] Field of Search ..... 536/98

[56] References Cited

U.S. PATENT DOCUMENTS

| | | | |
|---|---|---|---|
| 2,767,170 | 10/1956 | Graybeal et al. | 536/101 |
| 3,284,441 | 11/1966 | Bishop et al. | 536/98 |
| 3,900,463 | 8/1975 | Yada et al. | 536/98 |
| 4,063,018 | 12/1977 | Ohnaka et al. | 536/98 |
| 4,306,061 | 12/1981 | Majewicz | 536/98 |
| 4,339,573 | 7/1982 | Wüst et al. | 536/98 |
| 4,401,813 | 8/1983 | Lowell et al. | 536/98 |

*Primary Examiner*—Ronald W. Griffin
*Attorney, Agent, or Firm*—Flynn, Thiel, Boutell & Tanis

[57] ABSTRACT

Sodium carboxymethylcellulose is disclosed wherein the average degree of substitution ($\overline{DS}$) of carboxymethyl groups per anhydroglucose unit is in the range of 0.4 to 1.6, the number-average degree of polymerization is in the range of 100 to 1,500, and the mobility distribution ($\Delta U$) as measured by electrophoresis is represented by the following formula: [$\Delta U \times 10^5 < (-3.0 \log DS + 3.20) \times 10^5$ cm²/sec·V.] $\Delta U \times 10^5 < (-3.0 \log \overline{DS} + 3.20)$ cm²/sec·V.

5 Claims, 4 Drawing Sheets

SODIUM CARBOXYMETHYLCELLULOSE

Matter enclosed in heavy brackets [ ] appears in the original patent but forms no part of this reissue specification; matter printed in italics indicates the additions made by reissue.

This invention relates to a novel sodium carboxymethylcellulose whose mobility distribution (ΔU) as measured by electrophoresis is represented by the following formula:

$$[\Delta U \times 10^5 < (-3.0 \log \overline{DS} + 3.20) \times 10^5 \text{ cm}^2/\text{sec}\cdot V]$$

$$\Delta U \times 10^5 < (-3.0 \log \overline{DS} + 3.20) \text{cm}^2/\text{sec}\cdot V$$

wherein $\overline{DS}$ is an average degree of substitution of carboxymethyl groups per anhydroglucose unit.

As is well known, sodium carboxymethylcellulose (hereinafter abbreviated as CMC) has long been manufactured in industry and has been applied in a variety of uses, such as paste or thickening agent.

CMC is used in most cases in the form of an aqueous solution and, therefore, problems arise due to its form, for example, susceptibility to enzymatic decomposition and a marked loss of solution viscosity by a salt, for example, sodium chloride. In addition, there have been problems such as strong thixotropy and marked changes in its solution viscosity with the lapse of time, so that improvements in its respective uses have long been expected.

The inventors of this invention have found that it is necessary to confine the carboxymethyl group distribution within a specified range in order to solve the above problems, especially behavior in an aqueous solution, more particularly, solution behavior such as viscosity loss due to the presence of a salt and marked thixotropy.

In this invention, the carboxymethyl group distribution is expressed by a mobility distribution for the sake of its actual measurement, as will be described hereinbelow.

It is suggested by Terashima et al., in Polymer Journal. Vol. 8, pp. 449 to 455 (1976) that the charge density distribution of a polyelectrolyte, for example, the substitution degree distribution of CMC, can be measured electrophoretically.

In this invention, the substitution degree is understood in terms of a mobility distribution as measured by electrophoresis, and this mobility distribution is defined as one measured according to the following method.

The measurement of the DS distribution by electrophoresis is made at 25°±0.1° C. by using a Tsukasa-Tiselius electrophoresis apparatus and a Schlieren optical system, under the following conditions:

sample concentration: 0.2 g/100 ml
solvent: 0.1 N aqueous NaCl solution
electric current: 2 mA When the electrophoresis is carried out under these conditions, electrophoretic mobility U can be determined experimentally by the following equation:

$$U = \frac{K \cdot A}{t} \cdot \frac{h}{t}$$

wherein

Figure 1:
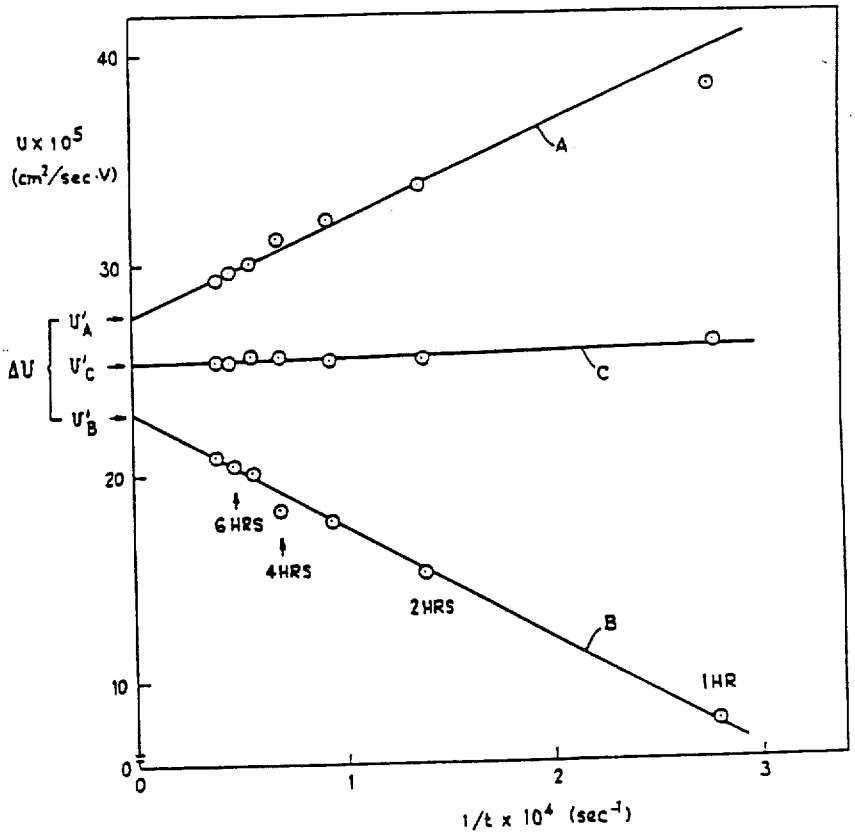
FIG. 1 is a diagram obtained by plotting the relationship between a migration time and a mobility.
Figure 2:
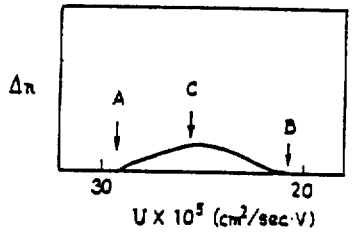
FIG. 2 is a diagram schematically showing the state of an electrophoretic boundary in terms of a rate of changes in refractive index.

K: specific conductivity of solvent $1.067 \times 10^{-2} \Omega/\text{cm}$
A: cross-sectional area of cell 0.351 $\text{cm}^2$
i: migration current 0.002 A
h: migration distance X cm
t: migration time The state of a boundary realized by carrying out electrophoresis is shown schematically in FIG. 2 in terms of a rate of change (Δn) in refractive index (DS=0.73, after 7 hours) and maximum mobility A, minimum mobility B and median mobility C are obtained corresponding to the respective migration times. In this invention, migration in an ascending boundary is measured for convenience sake, and the mobilities i.e., the values of points A, B and C are plotted against an abscissa, which represents a reciprocal of the time to obtain lines (DS=0.73, 1% viscosity 210 cP) of FIG. 1. Extrapolation to infinite time gives mobilities $U_A'$, $U_B'$ and $U_C'$. $U_A'-U_B'$ is defined as a mobility distribution (ΔU).

Figure 4:
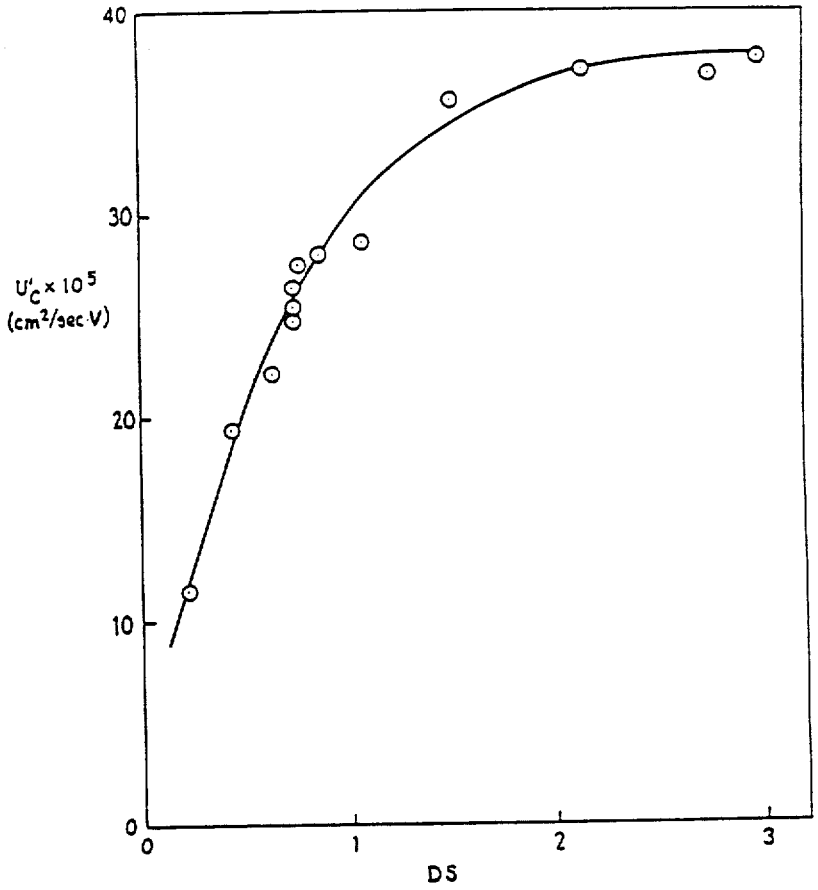
FIG. 4 is a diagram obtained by plotting the relationship between the average degree of substitution and the median mobility.

FIG. 4 is obtained by plotting $U_C'$ against an average DS as measured by a conventional chemical measurement. As apparent from this figure, the ΔU represents the width of a DS distribution (ΔDS), that is, the difference between the maximum DS and minimum DS of a CMC sample.

On the other hand, the solution behavior of an aqueous CMC solution is affected phenomenally by salt water resistance and thixotropy, but there is fundamentally an anhydroglucose unit which has no carboxymethyl [group] *groups* because of a heterogeneity of the reaction or for lack of an absolute amount, that is, a slightly soluble portion and a soluble portion having carboxymethyl groups in the CMC molecule.

When a CMC has a more uniform DS distribution, it has a larger amount of the soluble portion at the same average DS, so that it is smaller in the extent of weakening of the repulsive force of the soluble portion which occurs when a salt, for example, sodium chloride is added to an aqueous soluble portion, which increases when shear stress is decreased. In other words, the extent of development of thixotropy decreases when the external force disappears. Thus the stability of the solution, which is established by a balance between the repulsive force among the soluble portions and the cohesive force of the slightly soluble portion, depends on the DS distribution, while a CMC having a higher average DC or having a larger amount of the soluble portion exhibits a higher stability when it is in solution. Accordingly, a CMC having an average of DS of above 2.0 has a stable state irrespective of its production process, because it has a soluble portion constituted by substituting at least one carboxymethyl group into each of almost all anhydroglucose units, whereas a CMC having an average of DS of below about 0.5 has an essentially unstable solution state, becaue half of the anhydroglucose units have no substitutents, however uniformly it may be substituted by carboxymethyl groups. Especially, when the DS is below about 0.3, the CMC becomes water-insoluble. However, a CMC having a higher uniformity has a more stable solution state even in these cases. For this reason, an object of this invention is to improve the solution state of a CMC having an average DS of 0.4 to 1.6.

The inventors of this invention have measured the solution state stability typified by ΔU, i.e., ΔDS and a resistance to salinity and enzyme of commercially available CMC's and those produced by a variety of production processes, including that of the prior application of the applicant of this invention. The results are shown in Table 2 below.

Figure 3:
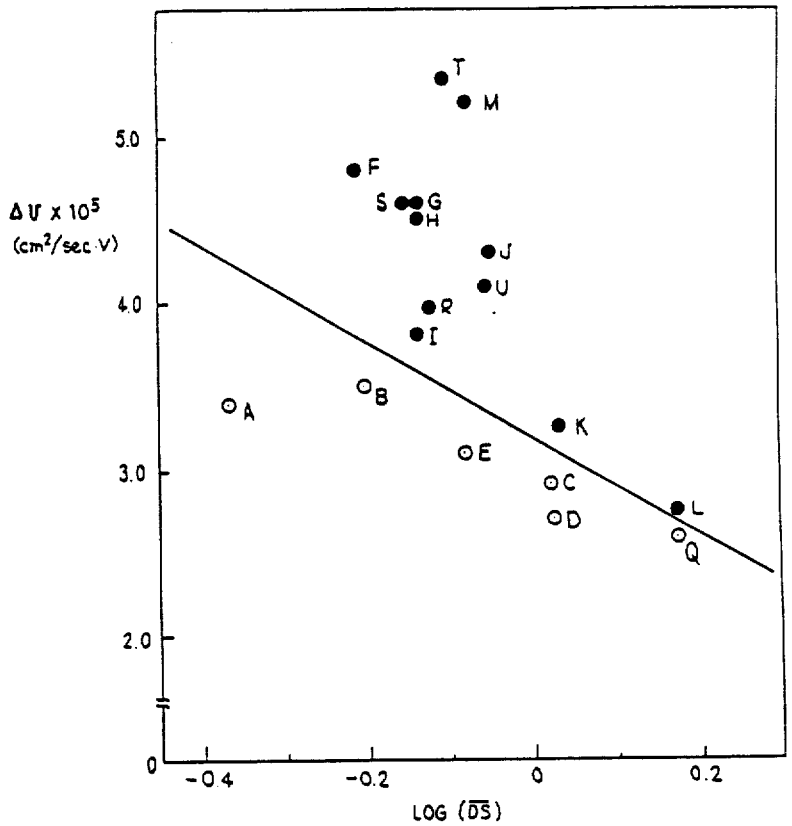
FIG. 3 is a diagram obtained by plotting the relationship between the mobility distribution of a variety of CMC's and average degrees of substitution of carboxymethyl groups.

These results are illustrated by a diagram of FIG. 3 showing the relationship between $\log(\overline{DS})$ and ΔU, wherein closed and open circles are distinguished from each other according to the following criterion.

In the criterion, among CMC's having an average DS of above 0.7, those having a salt water resistance of below 0.9 are represented by closed circles, while those having a salt water resistance of 0.9 or above are represented by open circles. When it is supposed that, from the values of salt water resistance of CMC's having nearly the same average DS, the value of salt resistance between them is directly proportional to ΔU, the line formed by points which show a value of salt water resistance of 0.9 is represented as above by the following equation:

[$\Delta U \times 10^5 = \{-3.0 \log(\overline{DS}) + 3.20\} \times 10^5$.]

$\Delta U \times 10^5 = \{-3.0 \log(\overline{DS}) + 3.20\}$.

When this line is extrapolated to a point of an average DS of below 0.7, the line forms a boundary between CMC's having good (in a relative sense) salt water resistance and those having poor (in a relative sense) salt water resistance and, in relative values showing a comparison of the enzyme resistance at the same average DS, the line constitutes a boundary beyond which the enzyme resistance is nearly doubled. It has been found that the above-mentioned line constitutes also a boundary between known and unknown CMC's, that is, those prepared according to the processes described in [Japanses] *Japanese* Patent Application Nos. 50277/1981 and 142731/1981, corresponding to U.S. Pat. No. 4,426,518.

The novel CMC of this invention has a more uniform substituent distribution than the conventional or commercially available products such as those prepared by using ordinary monochloroacetic acid as an etherifying agent, so that it is featured by having, for example, markedly excellent salt water resistance, which is a property of great practical importance in applications of CMC, such as oil drilling mud. It is well known that CMC [is] *in* an aqueous solution containing a strong electrolyte such as sodium chloride undergoes a marked loss of viscosity as compared with the case where it is in a pure solution because, since CMC is a polyelectrolyte, its dissociation in such an aqueous solution is depressed, which is a great drawback in applications where it is dissolved in an aqueous solution containing a salt, such as those encountered in oil drilling.

However, as shown in the examples hereafter described, the CMC of this invention has such excellent salt water resistance that is scarcely undergoes the viscosity loss but rather somewhat increases in viscosity even when it is dissolved in a 4% aqueous sodium chloride solution as compared with the case when it is dissolved in pure water.

Moreover, the CMC of this invention has uniformly introduced substituents, so that it is lower in the content of undissolved matter and semi-dissolved swollen gel and excellent in transparency as compared with those prepared by conventional processes and further plugging of a screen is less when it is used as a textile printing paste. Moreover, this CMC is excellent in enzyme resistance (putrefaction resistance) which is a property of great practical importance in various uses such as ground drilling, oil drilling, slurry explosives, lactic acid beverages, toothpastes, textile printing pastes, water-based pastes and fiber walls.

As the processes for producing the present invention CMC, there were proposed by the inventors of this invention a process for producing a CMC having excellent salt water resistance as described above, comprising using an etherifying agent prepared by esterifying at least 50% of monochloroacetic acid with isopropyl alcohol. (Japanese Patent Application No. 50277/1981) and a process for producing an alkali salt of carboxymethylcellulose ether by reacting a cellulosic material with an etherifying agent in an aqueous organic solvent system in the presence of an alkali characterized in that the entire portion of the [etherfying] *etherifying* agent is added at the initial stage; the etherification reaction is started in the system which is excess in the etherifying agent to such an extent that the alkali is present in a molar ratio, [alkali]/[etherifying agent], of above 0.10 to 0.99, and then the etherification reaction is conducted by adding the alkali in portions so that the molar ratio, [alkali]/[etherifying agent] at the final stage is above 1.00 (Japanese Patent Application No. 142731/1981, corresponding to U.S. Pat. No. 4,426,518), [where] *wherein*

[alkali]/[etherifying agent]

$$\frac{\text{mol no. of alkali fed in each stage} - \text{mol. no. of alkali neutralized with etherifying agent}}{\text{mol no. of etherifying agent fed}}$$

The CMC's obtained by these processes have a very uniform distribution of carboxymethyl groups so that they have a low value of the mobility/distribution (ΔU) as measured by electrophoresis, thus constituting a novel CMC of this invention.

Namely, according to these processes, it is possible to obtain CMC's having a uniformity of DS distribution expressed in terms of ΔU which has, as the upper limit, a value represented by the following formula:

[$\Delta U \times 10^5 < (-3.0 \log\overline{DS} + 3.20) \times 10^5$ cm²/sec·V.]

$\Delta U \times 10^5 < (-3.0 \log\overline{DS} + 3.20)$ cm²/sec·V.

On the other hand, [through] *though* its lower limit is not particularly specified, it is generally represented by the following formula:

[$\Delta U \times 10^5 < (-2.0 \log\overline{DS} + 20) \times 10^5$ cm²/sec·V.]

$\Delta U \times 10^5 < (-2.0 \log\overline{DS} + 2.0)$ cm²/sec·V.

Synthesis examples of CMC samples of this invention and comparative CMC samples are shown below. Herein, parts are parts by weight and % is % by weight.

SAMPLE A (this invention, according to the process of Japanese Patent Application No. 50277/1981)

A 5-liter double-impeller reactor was charged with 651.2 parts of isopropyl alcohol (purity 100%, hereinafter abbreviated as iPA) and then with 96.0 parts of sodium hydroxide (purity 98%) dissolved in 143.0 parts of deionized water and, after cooling to 20° C., further with 200 parts of powdered cellulose (purity 95%, average polymerization degree 850). The contents were agitatd at 20° to 30° C. for 60 minutes to obtain alkali cellulose. Then, 87.6 parts of isopropyl monochloroacetate (purity 99%) and 56.3 parts of isopropyl acetate (purity 99%) for use in neutralization of excessive sodium hydroxide were diluted with 95.8 parts of iPA and added. The resulting mixture was agitated at 20° to 30° C. for 30 minutes. Then, the temperature was raised to 70° C., and the mixture was agitated for 2 hours to effect the etherification reaction, followed by neutralization of an excess of sodium hydroxide by acetic acid.

After the reaction, the reaction mixture was withdrawn from the reactor, centrifuged to remove iPA as reaction solvent, then washed twice with 4,000 parts of 75% aqueous methyl alcohol to remove sodium chloride and sodium glycolate as by-products, and then centrifuged to remove the aqueous methyl alcohol.

The purified product was dried in a dryer at 80° to 100° C. for about 4 hours to obtain 255 parts of the CMC of this invention.

SAMPLES B THROUGH F

Samples B through F were obtained by carrying out the reaction and the purification under the same conditions for Sample A, except that the kinds and amounts of cellulosic material, sodium hydroxide and etherifying agents were varied as shown in Table 1. Samples B through E are CMC's of this invention, while sample F is a CMC of a comparative example.

TABLE 1

| | Cellulosic material | | | | |
|---|---|---|---|---|---|
| Sample | Amount (parts) | Purity (%) | Degree of polymerization | Amount of iPA (parts) | Amount of deionized water (parts) |
| B | 200 | 95 | 850 | 659.4 | 143 |
| C | 200 | 95 | 2500 | 597.0 | 143 |
| D | 200 | 95 | 2300 | 597.0 | 143 |
| E | 200 | 95 | 2300 | 632.0 | 153 |
| F | 200 | 95 | 2300 | 659.4 | 143 |
| A | 200 | 95 | 850 | 651.2 | 143 |

| | Sodium hydroxide | | Etherifying agent | | |
|---|---|---|---|---|---|
| Sample | Amount (parts) | Purity (%) | Kind | Amount (parts) | Purity (%) |
| B | 86.2 | 98 | isopropyl monochloroacetate | 126.6 | 99 |
| C | 136.0 | 98 | isopropyl monochloroacetate | 216.0 | 99 |
| D | 136.0 | 98 | isopropyl monochloroacetate | 216.0 | 99 |
| E | 103.0 | 98 | isopropyl monochloroacetate | 164.0 | 99 |
| F | 86.2 | 98 | monochloroacetic acid | 126.6 | 99 |
| A | 96.0 | 98 | isopropyl monochloroacetate | 87.6 | 99 |

| | Etherifying agent | Isopropyl acetate | | Amount of CMC |
|---|---|---|---|---|
| Sample | Amount of iPA as solvent (parts) | Amount (parts) | Purity (%) | formed (parts) |
| B | 87.6 | 0 | — | 245 |
| C | 150.0 | 0 | — | 282 |
| D | 150.0 | 0 | — | 285 |
| E | 114.0 | 0 | — | 262 |
| F | 87.6 | 0 | — | 243 |
| A | 95.8 | 56.3 | 99 | 235 |

SAMPLE Q (this invention, according to the process of Japanese Patent Application No. 142731/1981)

A 5-liter double-impeller reactor was charged with 1,032 parts of iPA, then with 180.8 parts of sodium hydroxide (purity 98%) dissolved in 158.0 parts of deionized water and, after cooling to 20° to 30° C., further with 200 parts of powdered cellulose (purity 95%). The contents were agitated at 20° to 30° C. for 60 minutes to obtain alkali cellulose. Then, the temperature was raised to 60° C. over 10 minutes and the mixture was etherified for 60 minutes. Then, 63.5 parts of sodium hydroxide dissolved in 42.3 parts of deionized water was added. The resulting mixture was agitated at 60° to [60°] *70°* C. for 15 minutes and then etherified at 70° C. for 90 minutes. Then, some remaining sodium hydroxide was neutralized with acetic acid.

After the reaction, the reaction mixture was withdrawn from the reactor, centrifuged to remove iPA as reaction solvent, then washed three times with 4,000 parts of 75% aqueous methyl alcohol to remove sodium chloride, sodium glycolate and sodium acetate as by-products, and [centifuged] *centrifuged* to remove the aqueous methyl alcohol. The purified product was dried in a dryer at 80° to 100° C. for about 6 hours to obtain the CMC of this invention.

Measurements were made for the average degree of substitution ($\overline{DS}$), number-average degree of polymerization ($\overline{P}$), mobility distribution ($\Delta U$), salt water resistance and enzyme resistance of a variety of CMC's shown in Table 2, including the above samples A through E and Q of this invention, a comparative sample F and commercially available products G, H, I, J, K, L, M, N and P. The results are shown in Table 2.

TABLE 2

| Classification | Sample | $\overline{DS}$ | 1% viscosity cP | Average degree of polymerization (DP) | $\Delta U_2 \times 10^5$ ($cm^2$/sec · V) | resistance to salinity | resistance to enzyme |
|---|---|---|---|---|---|---|---|
| CMC of this invention | A | 0.43 | 1040 | 595 | 3.40 | 0.1 | 39.5 |
| | B | 0.63 | 1340 | 660 | 3.50 | 0.3 | 23.5 |
| | C | 1.07 | 5910 | 1290 | 2.90 | 1.10 | 8.5 |
| | D | 1.08 | 3880 | 1060 | 2.70 | 1.13 | 7.8 |
| | E | 0.83 | 4540 | 1150 | 3.10 | 1.02 | 9.4 |
| | Q | 1.52 | 2300 | 800 | 2.60 | 1.15 | 0.1 |
| Comparative | F | 0.63 | 5100 | 1200 | 4.8 | 0.01 | 35.2 |

TABLE 2-continued

| Classification | Sample | $\overline{DS}$ | 1% viscosity cP | Average degree of polymerization (DP) | $\Delta U_2 \times 10^5$ ($cm^2$/sec · V) | resistance to salinity | resistance to enzyme |
|---|---|---|---|---|---|---|---|
| sample | | | | | | | |
| Commercially | G | 0.73 | 75 | 250 | 4.6 | 0.64 | 28.9 |
| available | H | 0.73 | 290 | 400 | 4.5 | 0.50 | 27.8 |
| products | I | 0.73 | 221 | 355 | 3.8 | 0.55 | 28.4 |
| | J | 0.89 | 3800 | 1110 | 4.30 | 0.75 | 18.7 |
| | K | 1.08 | 2600 | 860 | 3.2 | 0.76 | 17.7 |
| | L | 1.51 | 290 | 230 | 2.75 | 0.80 | 5.5 |
| | M | 0.85 | 31 | 190 | 5.2 | 0.56 | 20.4 |
| | N | 0.63 | 81 | 250 | 7.0 | 0.01 | 45.0 |
| | P | 0.60 | 18.5 | 320 | 6.9 | 0.01 | 38.2 |
| Commercially | R | 0.75 | 69.4 | 240 | 4.0 | 0.69 | 26.5 |
| available | S | 0.71 | 940 | 580 | 4.6 | 0.52 | 29.3 |
| product | T | 0.76 | 45.5 | 205 | 5.3 | 0.41 | 29.5 |
| | U | 0.89 | 232 | 385 | 4.1 | 0.77 | 18.0 |

Note

1. CMC Samples G to N, P and R are commercially available in the state of arts. Among them, M is a product prepared by the aqueous medium process and the others are those obtained by the solvent process. Each Prior sample is available from the following.

G: Grade No. 1130 of Daicel Chemical Industries, Ltd.
H: Grade No. 1150 of Daicel Chemical Industries, Ltd.
I: Celogen WSA of Daiichi Kogyo Seiyaku K.K.
J: Celogen EP of Daiichi Kogyo Seiyaku K.K., suitable for oil drilling
K: Grade No. 2200H of Daicel Chemical Industries, Ltd., suitable for drilling
L: Grade No. 1860 of Daicel Chemical Industries, Ltd., suitable for textile printing paste
M: Cellucol M of Adachi Koryo K.K.
N: Grade No. PNo5L of Sanyo Kokusaku Pulp K.K. suitable for textile printing paste
P: Grade No. SP-150 of Daiichi Kogyo Seiyaku K.K. suitable of textile printing paste
R: Cekol MVE of Udeholm in Sweden
S: Tylose C-1000p of Hoechst in W. Germany
T: Finnix of Metsaluton in Finnland
U: Carbocel AG/LA of Lamberti in Italy The measurement and evaluation of (1) degree of substitution ($\overline{DS}$), (2) salt water resistance and (3) enzyme resistance listed in Table 2 were made as follows.

(1) Degree of substitution ($\overline{DS}$)

1 g of CMC is accurately weighed out, placed in a platinum or porcelain crucible and ashed at 600° C. The sodium oxide formed by the ashing is titrated with N/10 sulfuric acid by using phenolphthalein as an indicator. The DS is determined by substituting the volume of the acid added (A ml) into the following equation.

$$DS = \frac{162 \times A \times f}{10.000 - 60 \times A \times f}$$

f: factor of N/10 sulfuric acid (2) Salt water resistance

Salt water resistance is evaluated in terms of viscosity ratio represented by the formula shown below. Viscosity is measured with a BL viscometer with rotor #4, 60 rpm, at 25° C.

$$\left[\text{viscosity} \frac{\text{viscosity of 1 wt. \% CMC in 4\% aqueous NaCl solution (cP)}}{\text{viscosity of 1 wt. \% CMC in pure water (cP)}}\right]$$

$$\textit{viscosity ratio} = \frac{\textit{viscosity of 1 wt. \% CMC in 4\% aqueous NaCl solution (cP)}}{\textit{viscosity of 1 wt. \% CMC in pure water (cP)}}$$

The higher the viscosity ratio, the more excellent the salt water resistance.

(3) Enzyme resistance

To a 1% aqueous CMC solution is added 5 mg/g-CMC of cellulase (Cellulase-AP, a product of Amano Pharmaceutical Co., Ltd.), and the solution is hydrolyzed at room temperature for 140 to 145 hours (the hydrolysis being brought to substantial completion in about 140 hours). Then, the glucose formed as the hydrolyzate is measured by the glucose oxidase method. When the amount of glucose formed is smaller, the CMC is evaluated as having a higher enzyme resistance.

Here the values of enzyme resistance shown in Table 2 are represented by the amount of glucose formed as expressed by the number per 1,000 anhydroglucose units (number/1,000 AGU).

The embodiments of the invention in which an exclusive property or privilege is claimed are defined as follows:

1. A composition consisting essentially of sodium carboxymethylcellulose having (1) an average degree of carboxymethyl substitution ($\overline{DS}$), per anhydroglucose unit, in the range of from 0.4 to 1.08, (2) a number-average degree of polymerization in the range of from 100 to 1500, and (3) a mobility distribution $\Delta U$, as measured by electrophoresis in the range of from $$[\Delta U \times 10^5 < (-3.0 \log \overline{DC} + 3.20) \times 10^5 \text{ cm}^2/\text{sec}\cdot V]$$

$$\Delta U \times 10^5 < (-3.0 \log \overline{DS} + 3.20) cm^2/sec\cdot V$$

to $$[\Delta U \times 10^5 < (-2.0 \log \overline{DS} + 2.0) \times 10^5 \text{ cm}^2\text{sec}\cdot V.]$$

$$\Delta U \times 10^5 < (-2.0 \log \overline{DS} + 2.0) cm^2/sec\cdot V,$$

said composition having been prepared by the process comprising the steps of forming an alkali cellulose solution, reacting said alkali cellulose with an etherifying agent consisting essentially of an esterification product of monochloroacetic acid with isopropyl alcohol, and then recovering said composition, said composition having a salinity resistance viscosity ratio of at least 1.02, said salinity resistance viscosity ratio being determined by dividing the viscosity of a 4% aqueous NaCl solution containing 1 wt.% of said sodium carboxymethylcellulose by the viscosity of pure water containing 1 wt.% of said sodium carboxymethylcellulose, said composition having an enzyme resistance of not higher than 9.4 expressed as the number of glucose units formed per 1000 anhydroglucose units when, to a 1% aqueous solution of said sodium carboxymethylcellulose, there is added 5 mg of cellulase per gram of said sodium carboxymethylcellulose, then the solution is hydrolyzed at room temperature for 140 to 145 hours and then the glucose formed as the hydrolyzate is measured by the glucose oxidase method.

2. A composition according to claim 1, wherein said average degree of substitution DS is in the range of 0.83–1.08, and said number average degree of polymerization is in the range of 1060 to 1290.

3. A composition consisting essentially of sodium carboxymethylcellulose having (1) an average degree of carboxymethyl substitution ($\overline{DS}$), per anhydroglucose unit, in the range of from 0.4 to 1.6, (2) a number-average degree of polymerization in the range of from 100 to 1500, and (3) a mobility distribution ΔU, as measured by electrophoresis, and in the range of from $$[\Delta U \times 10^5 < (-3.0 \log \overline{DS} + 3.20) \times 10^5 \text{ cm}^2/\text{sec}\cdot V]$$

$$\Delta U \times 10^5 < (-3.0 \log \overline{DS} + 3.20) \text{cm}^2/\text{sec}\cdot V$$

to $$[\Delta U \times 10^5 < (-2.0 \log \overline{DS} + 2.0) \times 10^5 \text{ cm}^2/\text{sec}\cdot V]$$

$$\Delta U \times 10^5 < (-2.0 \log \overline{DS} + 2.0) \text{cm}^2/\text{sec}\cdot V$$

said composition having been prepared by the process comprising the steps of forming a mixture of an aqueous sodium hydroxide solution and isopropyl alcohol, adding powdered cellulose to said mixture under conditions effective to form sodium cellulose, adding isopropyl monochloroacetate, isopropyl acetate and isopropyl alcohol to said mixture containing sodium cellulose, then reacting said sodium cellulose with said isopropyl monochloroacetate under conditions effective to form sodium carboxymethylcellulose, and then recovering said composition, said composition having a higher salinity resistance and a higher resistance to enzymatic degradation in comparison to other sodium carboxymethylcelluloses having the same average degree of carboxymethyl substitution but having a mobility distribution outside said range.

4. A composition according to claim 3, wherein said sodium carboxymethylcellulose is isolated by neutralizing excess sodium hydroxide in said mixture, then centrifuging said mixture to remove isopropyl alcohol therefrom, then washing said mixture with aqueous methyl alcohol to remove sodium chloride and sodium glycolate therefrom, then centrifuging said mixture to remove methyl alcohol therefrom, and then drying said mixture to obtain said sodium carboxymethylcellulose, and said isopropyl monochloroacetate, isopropyl acetate and isopropyl alcohol are mixed together before being added to said mixture.

5. A composition consisting essentially of sodium carboxymethylcellulose having (1) an average degree of carboxymethyl substitution ($\overline{DS}$), per anhydroglucose unit, in the range of from 0.4 to 1.6, (2) a number-average degree of polymerization in the range of from 100 to 1500, and (3) a mobility distribution ΔU, as measured by electrophoresis, in the range of from $$[\Delta U \times 10^5 < (-3.0 \log \overline{DS} + 3.20) \times 10^5 \text{ cm}^2/\text{sec}\cdot V]$$

$$\Delta U \times 10^5 < (-3.0 \log \overline{DS} + 3.20) \text{cm}^2/\text{sec}\cdot V$$

to $$[\Delta U \times 10^5 < (-2.0 \log \overline{DS} + 2.0) \times 10^5 \text{ cm}^2/\text{sec}\cdot V,]$$

$$\Delta U \times 10^5 < (-2.0 \log \overline{DS} + 2.0) \text{cm}^2/\text{sec}\cdot V,$$

said composition having a higher salinity resistance and a higher resistance to enzymatic degradation in comparison to other sodium carboxymethylcelluloses having the same average degree of carboxymethyl substitution but having a mobility distribution outside said range.

* * * * *

UNITED STATES PATENT AND TRADEMARK OFFICE

CERTIFICATE OF CORRECTION

PATENT NO. : Re. 32 976

DATED : July 4, 1989

INVENTOR(S) : Atsushi TAGUCHI et al

It is certified that error appears in the above-identified patent and that said Letters Patent is hereby corrected as shown below:

Column 8, line 48; change "...$\overline{DC}$..." to ---...$\overline{DS}$...---.

line 55; change "$\Delta Ux10^5$<..." to ---$\Delta Ux10^5$>...---.

Column 9, line 25; change "[$\Delta Ux10^5$<..." to ---[$\Delta Ux10^5$>...---.

line 27; change "$\Delta Ux10^5$<..." to ---$\Delta Ux10^5$>...---.

Column 10, line 30; change "[$\Delta Ux10^5$<..." to ---[$\Delta Ux10^5$>...---.

line 32; change "$\Delta Ux10^5$<..." to ---$\Delta Ux10^5$>...---.

Signed and Sealed this

Fifteenth Day of May, 1990

*Attest:*

*Attesting Officer*

HARRY F. MANBECK, JR.

*Commissioner of Patents and Trademarks*

UNITED STATES PATENT AND TRADEMARK OFFICE

CERTIFICATE OF CORRECTION

PATENT NO. : Re: 32 976

DATED : July 4, 1989

INVENTOR(S) : Atsushi TAGUCHI et al

It is certified that error appears in the above-identified patent and that said Letters Patent is hereby corrected as shown below:

Column 4, line 65; change "$\Delta Ux10^5$<..." to ---$\Delta Ux10^5$>...---.

Signed and Sealed this

Eighth Day of December, 1992

*Attest:*

DOUGLAS B. COMER

*Attesting Officer*

*Acting Commissioner of Patents and Trademarks*